United States Patent [19]

Polstra

[11] Patent Number: 4,989,207
[45] Date of Patent: Jan. 29, 1991

[54] AUTOMATIC VERIFICATION OF KERNEL CIRCUITRY BASED ON ANALYSIS OF MEMORY ACCESSES

[75] Inventor: John D. Polstra, Seattle, Wash.

[73] Assignee: John Fluke Mfg. Co., Inc., Everett, Wash.

[21] Appl. No.: 275,183

[22] Filed: Nov. 23, 1988

[51] Int. Cl.⁵ .................. G01R 31/28; G06F 11/00
[52] U.S. Cl. .................................................. 371/16.2
[58] Field of Search .................... 371/16.2, 16.1; 364/200 MS File, 900 MS File

[56] References Cited

U.S. PATENT DOCUMENTS

| | | | |
|---|---|---|---|
| 4,055,801 | 8/1970 | Pike | 371/25.1 |
| 4,108,358 | 3/1977 | Niemaszyk | 371/22.1 |
| 4,139,818 | 9/1977 | Schneider | 371/16.2 |
| 4,192,451 | 5/1978 | Swerling | 371/22.4 |
| 4,402,055 | 1/1981 | Lloyd | 371/15.1 |
| 4,550,406 | 6/1983 | Neal | 371/22.6 |
| 4,567,592 | 9/1983 | Minicilli | 371/16.2 |
| 4,607,366 | 11/1983 | Stadlmeier et al. | 371/16.1 |
| 4,622,647 | 7/1983 | Sagnard et al. | 371/16.2 |
| 4,641,207 | 3/1983 | Green et al. | 371/16.2 |
| 4,641,348 | 11/1983 | Neuder | 382/1 |
| 4,656,632 | 2/1983 | Jackson | 371/27 |
| 4,674,089 | 6/1987 | Poret et al. | 371/16.2 |
| 4,687,988 | 6/1985 | Eichelberger | 371/22.3 |
| 4,691,316 | 2/1985 | Phillips | 371/16.2 |
| 4,868,822 | 9/1989 | Scott et al. | 371/16.2 |

OTHER PUBLICATIONS

Falk, Emulators Keep Pace with Chip Speeds and Complexity, Computer Design, May 15, 1987, pp. 31–38.

*Primary Examiner*—Charles E. Atkinson
*Attorney, Agent, or Firm*—Marshall M. Curtis; Marc A. Rossi

[57] ABSTRACT

A method and apparatus for providing automatic verification of the kernel circuitry of a microprocessor-based system in which the microprocessor ($\mu P$) include an instruction prefetch feature. During testing by memory emulation, the memory addresses accessed by the $\mu P$ are evaluated as to type of access, address and data size in accordance with a test program and a corresponding checking table to determine if such accesses are consistent with a funtional $\mu P$ of the same type. Other data structures such as flags and pointers are provided to enhance the verification operation and use of the checking table.

11 Claims, 13 Drawing Sheets

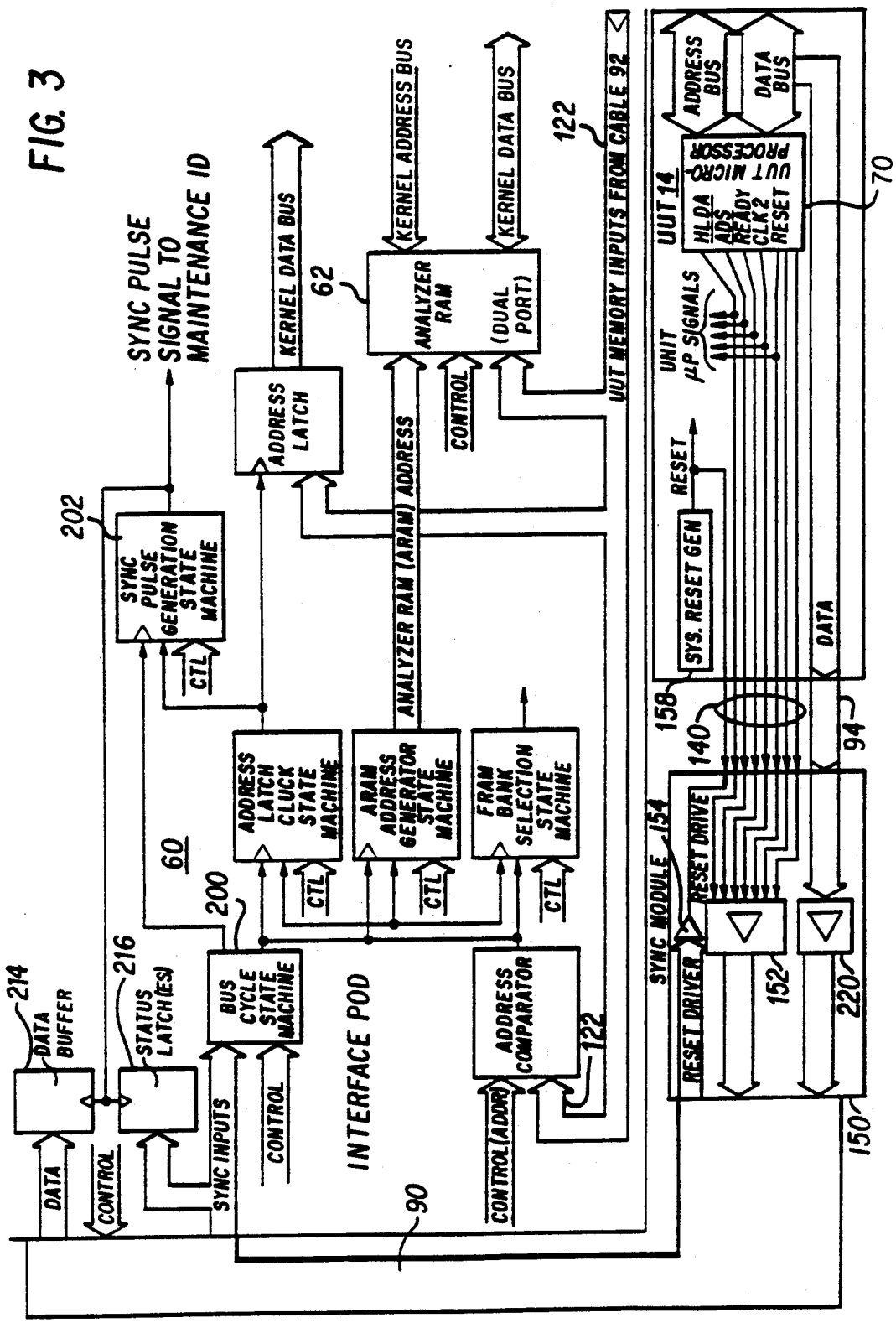

| Address | Object Code | Instruction | | Comment |
|---|---|---|---|---|
| 0000 | 3a 00 01 | ld | a,0100h | Load data from address 100 |
| 0003 | 3a 00 02 | ld | a,0200h | Load data from address 200 |
| 0006 | 3a 00 04 | ld | a,0400h | Load data from address 400 |
| 0009 | c3 09 00 | jp | 0009h | Loop in place at this address |

FIG. 4

| Entry | Instruction Address | Data Address | Size | Comment |
|---|---|---|---|---|
| 0 | ---- | 0000 | 0 | Execution begins at 0000 |
| 1 | 0002 | 0160 | 1 | Access 1 byte of data |
| 2 | 0005 | 0200 | 1 | Access 1 byte of data |
| 3 | 0008 | 0400 | 1 | Access 1 byte of data |
| 4 | 000B | 0009 | 0 | Jump to address 0009 |

FIG. 5

| Step | Address | Comment | |
|---|---|---|---|
| 0 | 0000 | Instruction fetch \ | |
| 1 | 0001 | Instruction fetch  > ld a,0100h | |
| 2 | 0002 | Instruction fetch / | |
| 3 | 0100 | Data access | |
| 4 | 0003 | Instruction fetch \ | |
| 5 | 0004 | Instruction fetch  > ld a,020h | |
| 6 | 0005 | Instruction fetch / | |
| 7 | 0200 | Data access | |
| 8 | 0006 | Instruction fetch \ | |
| 9 | 0007 | Instruction fetch  > ld a,040h | |
| 10 | 0008 | Instruction fetch / | |
| 11 | 0400 | Data access | |
| 12 | 0009 | Instruction fetch \ | |
| 13 | 000A | Instruction fetch  > jp 0009h | |
| 14 | 000B | Instruction fetch / | |
| 15 | 0009 | Instruction fetch \ | |
| 16 | 000A | Instruction fetch  > jp 0009h | |
| 17 | 000B | Instruction fetch / | |
| 18 | 0009 | Instruction fetch \ | |
| 19 | 000A | Instruction fetch  > jp 0009h | |
| 20 | 000B | Instruction fetch / | |
| ... | ... | (Repeats forever) | |

FIG. 6

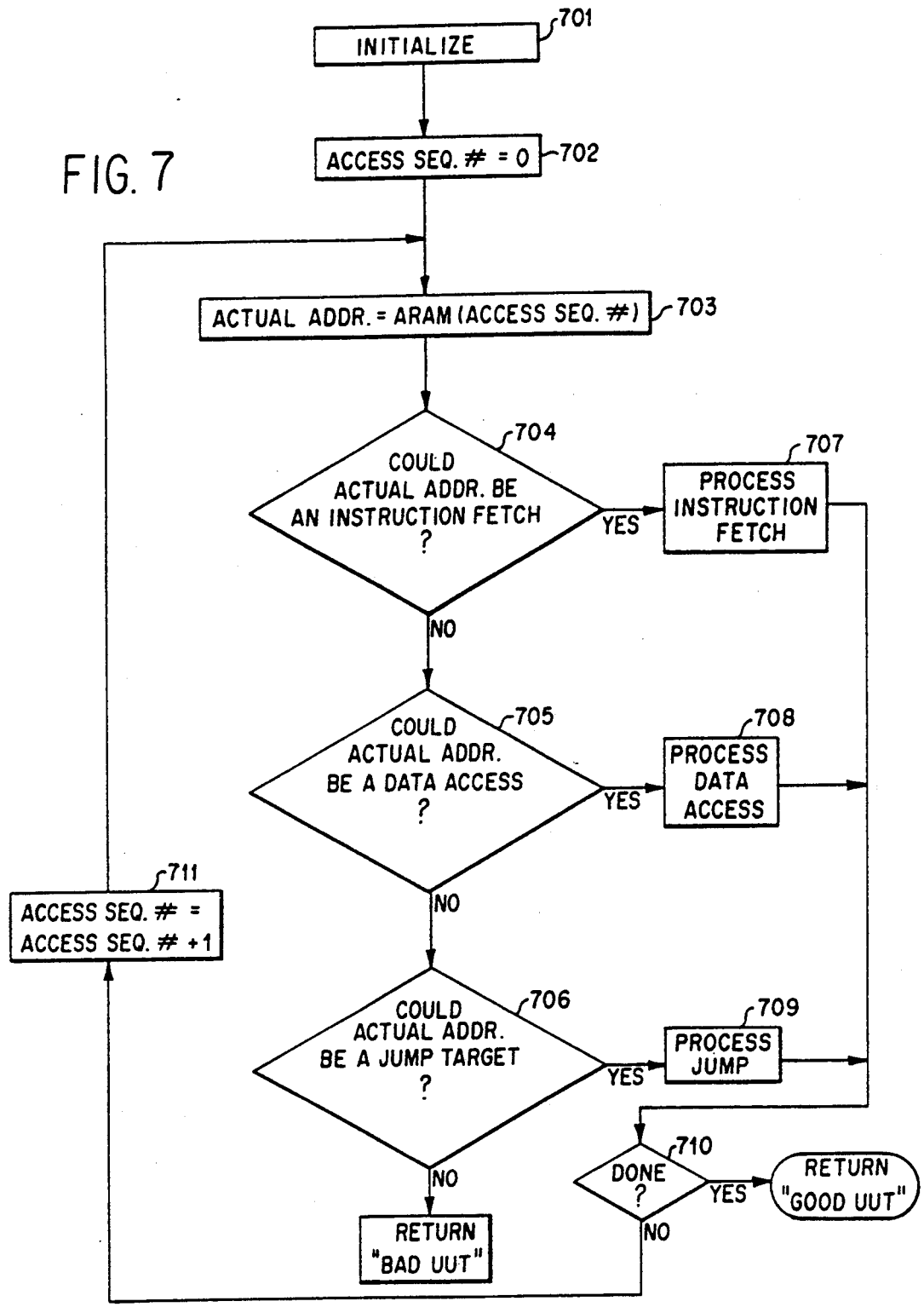

AUTOMATIC VERIFICATION OF KERNEL CIRCUITRY BASED ON ANALYSIS OF MEMORY ACCESSES

CROSS-REFERENCE TO RELATED APPLICATIONS

This application is related to concurrently filed KERNEL TESTING INTERFACE AND METHOD FOR AUTOMATING DIAGNOSTICS OF MICROPROCESSOR-BASED SYSTEMS by J. Polstra, M. Scott and B. White (Ser. No. 275,495, now abandoned), HARDWARE ENHANCEMENTS FOR IMPROVED PERFORMANCE OF MEMORY EMULATION METHOD by T. Locke (Ser. No. 275,184) and APPARATUS, METHOD AND DATA STRUCTURE FOR VALIDATION OF KERNEL DATA BUS by B. White, J. Polstra and C. Johnson (Ser. No. 275,185, now U.S. Pat. No. 4,958,347 issued Sept. 9, 1990) all assigned to the assignee of the present invention.

TECHNICAL FIELD

The present invention relates generally to the testing and troubleshooting of microprocessor-based electronic systems and more particularly to testing and troubleshooting of the kernel of microprocessor-based electronic systems using a memory emulation technique.

BACKGROUND OF THE INVENTION

With the wide use of complex microprocessor-based systems in both consumer and industrial products, automation of testing and diagnosis of circuit faults, particularly of the kernel of such systems, has become extremely desireable. The kernel of such a system is well-understood in the art to refer to the microprocessor ($\mu$P), itself, and the associated elements with which it is necessary for the microprocessor to correctly interact to function correctly, specifically the memory, clock, address bus and data bus. So-called emulative testers in which an element of the kernel is emulated by the testing apparatus have become popular for functional testing because they enable detailed diagnostics of the kernel even where the kernel is not even minimally operative.

One type of emulative tester is a microprocessor emulator, exemplified by the tester described in U.S. Pat. No. 4,455,654, issued to K. S. Bhaskar et al and assigned to the John Fluke Mfg. Co., Inc. In that system, connection is made to the UUT by removing the UUT $\mu$P and connecting the test system through the $\mu$P socket of the UUT.

Another type of emulative tester is a ROM (or memory) emulator. ROM emulation is deemed desireable since the ROM is in direct communication with the UUT data and address buses and the pin configurations of ROM sockets are relatively simple. ROM emulators are well known for use in software design and operational verification of the $\mu$P but have only recently been used for fault detection and diagnosis because no sync signal is typically available to synchronize the test equipment with the test results it receives. A solution to this problem is disclosed in U.S. patent application Ser. No. 07/158,223, of M. H. Scott et al, filed Feb. 19, 1988, now U.S. Pat. No. 4,868,822 issued 9-19-89, for MEMORY EMULATION METHOD AND SYSTEM FOR TESTING AND TROUBLESHOOTING MICROPROCESSOR-BASED ELECTRONIC SYSTEMS, and is hereby fully incorporated by reference herein. That test system comprises a $\mu$P-based mainframe and an interface pod which also includes a $\mu$P-based system which is connected to both the $\mu$P and the memory socket of the UUT. The interface pod includes special logic circuitry connected to the UUT $\mu$P to provide a fine resolution sync signal pulse during a bus cycle of interest in order to provide full troubleshooting fault isolation that is as effective as that provided by prior art $\mu$P emulation since the high resolution sync pulse derived from the $\mu$P can be used to isolate and evaluate signals monitored from the address and data buses at the memory socket with the same facility as they could be from $\mu$P connections. Also, as disclosed in that application, ROM emulation may be generalized to memory emulation (e.g. the emulation of any memory or portion of memory) since the trend in $\mu$P-based systems is to increase RAM while reducing ROM and possibly eliminating ROM altogether by substituting RAM. Therefore test systems must be adequately generalized to test systems not yet produced but, nonetheless, foreseeable in light of current trends in electronic microprocessor-based system architecture.

It will be important to understand the distinction between terms indicating different degrees of certainty of functionality provided by different testing procedures. The term "verification", as used herein indicates the ascertaining of at least a minimum level of functionality which is sufficient to allow a subsequent procedure to be conducted. The term "validation" indicates that if no fault is found, the entire structure validated may be considered fully functional. The term "test" is used to indicate a procedure where all existing faults will be found, but not necessarily isolated or identified. "Diagnosis", as used herein, indicates that all faults are found and identified.

As disclosed in the above noted copending application, KERNEL TESTING INTERFACE AND METHOD FOR AUTOMATING DIAGNOSTICS OF MICROPROCESSOR-BASED SYSTEMS, by Polstra et al, which is hereby fully incorporated by reference, a highly automated testing and diagnostics system and method has been provided utilizing memory emulation. A difficulty is encountered, however, in the testing of systems using modern microprocessors ($\mu$P) which utilize instruction prefetch logic which allows them to fetch instructions from memory before such instructions are actually needed. This logic causes the $\mu$P to overlap instruction fetching with the execution of already fetched instructions, permitting better bus utilization and higher program execution speeds.

While instruction prefetch logic yields improved performance in the $\mu$P, it causes difficulty in the testing of $\mu$P-based systems using such $\mu$Ps since instruction and data fetches are interleaved in an unpredictable order. The precise sequence of memory accesses is determined during program execution and may be affected by numerous factors such as $\mu$P execution speed, memory access time and non-CPU transactions such as RAM refresh cycles. Since memory emulation testing is primarily based on analysis of the response of the system to a given stimulus, it is usually necessary to be able to associate a response with the stimulus which provoked it. Clearly, then, instruction prefetch logic presents a major obstacle to testing and to the extension of the capabilities of test equipment to the testing of systems using $\mu$Ps having such a feature.

OBJECTS OF THE INVENTION

It is an object of this invention to provide a method for verification of kernel circuitry of μP-based systems having instruction prefetch logic.

It is another object of this invention to provide an apparatus for verification of the kernel of μP-based systems as a portion of a full testing and diagnostic procedure.

It is a further object of this invention to provide an enhancement for μP-based memory emulation test apparatus which enables automatic verification of kernel circuitry.

It is yet another object of this invention to provide a method of analysis of memory accesses during memory emulation testing which permits verification of kernel circuitry including μPs having instruction prefetch logic.

DISCLOSURE OF THE INVENTION

The invention is directed to an apparatus for testing and validation of the data bus of the kernel of a microprocessor-based system by memory emulation, including apparatus for conducting an analysis of memory accesses.

The invention includes a method for verification of a unit under test having a microprocessor including prefetch logic comprising the steps of providing an emulation memory for testing kernel circuitry of the unit, loading a test program and corresponding checking table into the emulation memory, executing the test program, monitoring the address of each memory access during execution of the program. Each address accessed is identified as an instruction access or a data access. It is then determined whether the address of each instruction access is greater than the preceding instruction access address, whether the address of each data access is greater than the preceding data access address, and whether the address of each data access corresponds to a location of data specified in the most recently accessed instruction, and establishing verification of said kernel circuitry when the program is completed based upon the results of the determining steps.

The invention also comprehends an apparatus for verification of a unit under test having a microprocessor including prefetch logic comprising an emulation memory means for testing kernel circuitry of said unit under test, means for loading a test program and corresponding checking table into said emulation memory, means for causing said microprocessor to execute the test program. The emulation memory means includes means for monitoring the address of each memory access during execution of the program. The apparatus of the invention also includes means for identifying each address accessed as one of at least an instruction access and a data access, comparison means for comparing each address of each instruction access with the preceding instruction access address and each address of each data access with the preceding data access address, and means for determining if the address of each data access corresponds to a location of data specified in the most recently accessed instruction. Further means are responsive to said first and second comparison means and said means for determining for establishing verification of said kernel circuitry.

The analysis provided by this invention permits automatic verification of the kernel circuitry of a μP-based system even when the memory access sequence cannot be predicted due to an instruction prefetch logic feature of the μP.

The above and other objects of the invention will become evident to those skilled in the art from the following detailed description of the invention with reference to the accompanying drawings.

BRIEF DESCRIPTION OF THE DRAWINGS

FIG. 3 is a detailed block diagram of the overall system as shown in FIG. 2.

FIG. 4 is a sample test program according to the invention adapted for the Z80 μP.

FIG. 5 is an exemplary checking table in accordance with the invention and corresponding to the program of FIG. 4.

FIG. 6 is an address trace according to the example of the program and checking table of FIGS. 4 and 5.

FIG. 7 is an overall flow diagram according to the invention.

BEST MODE OF PRACTICING THE INVENTION

Overview

Figure 1:
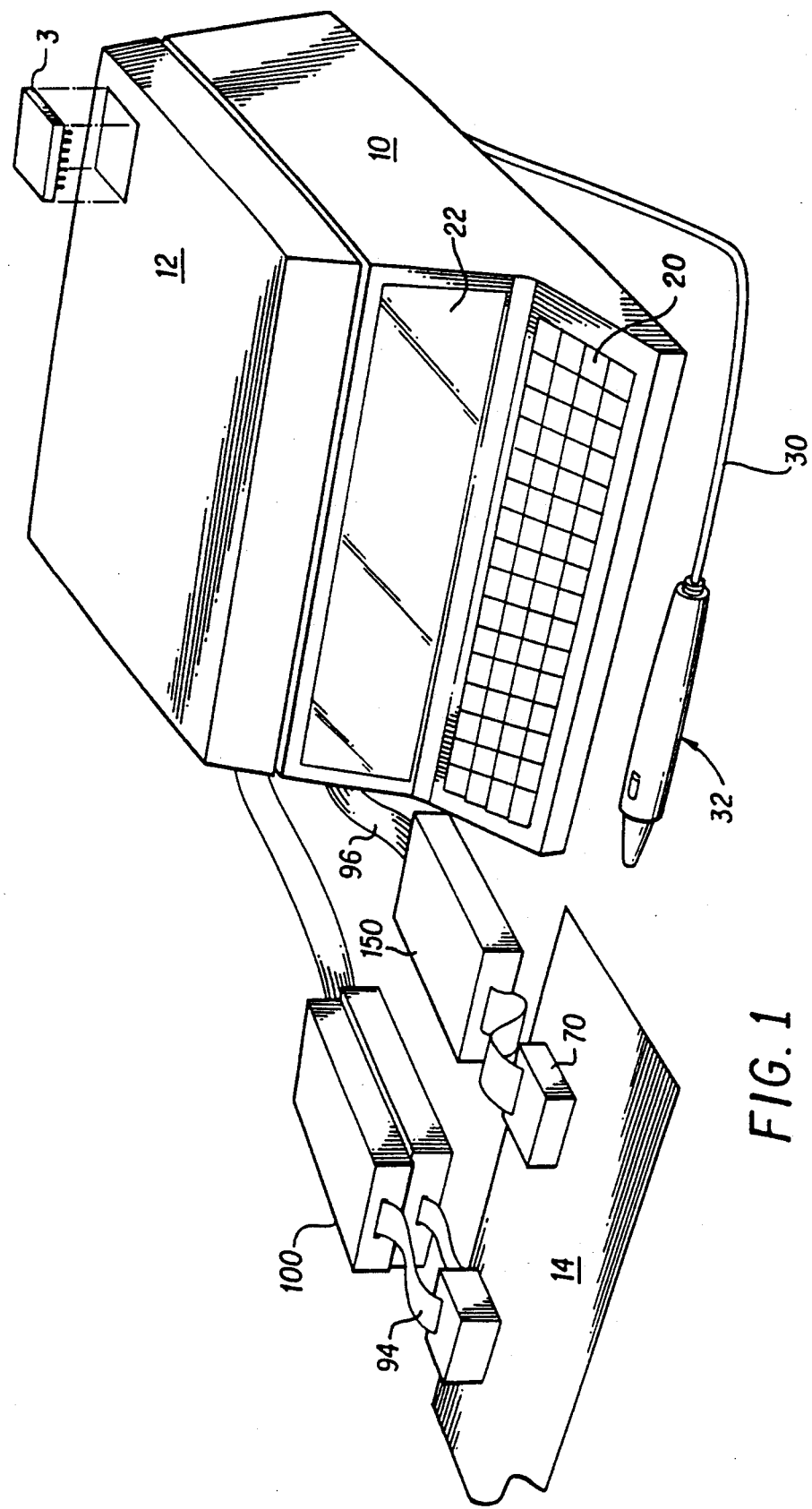
FIG. 1 is an illustration of testing apparatus incorporating this invention.
Figure 2:
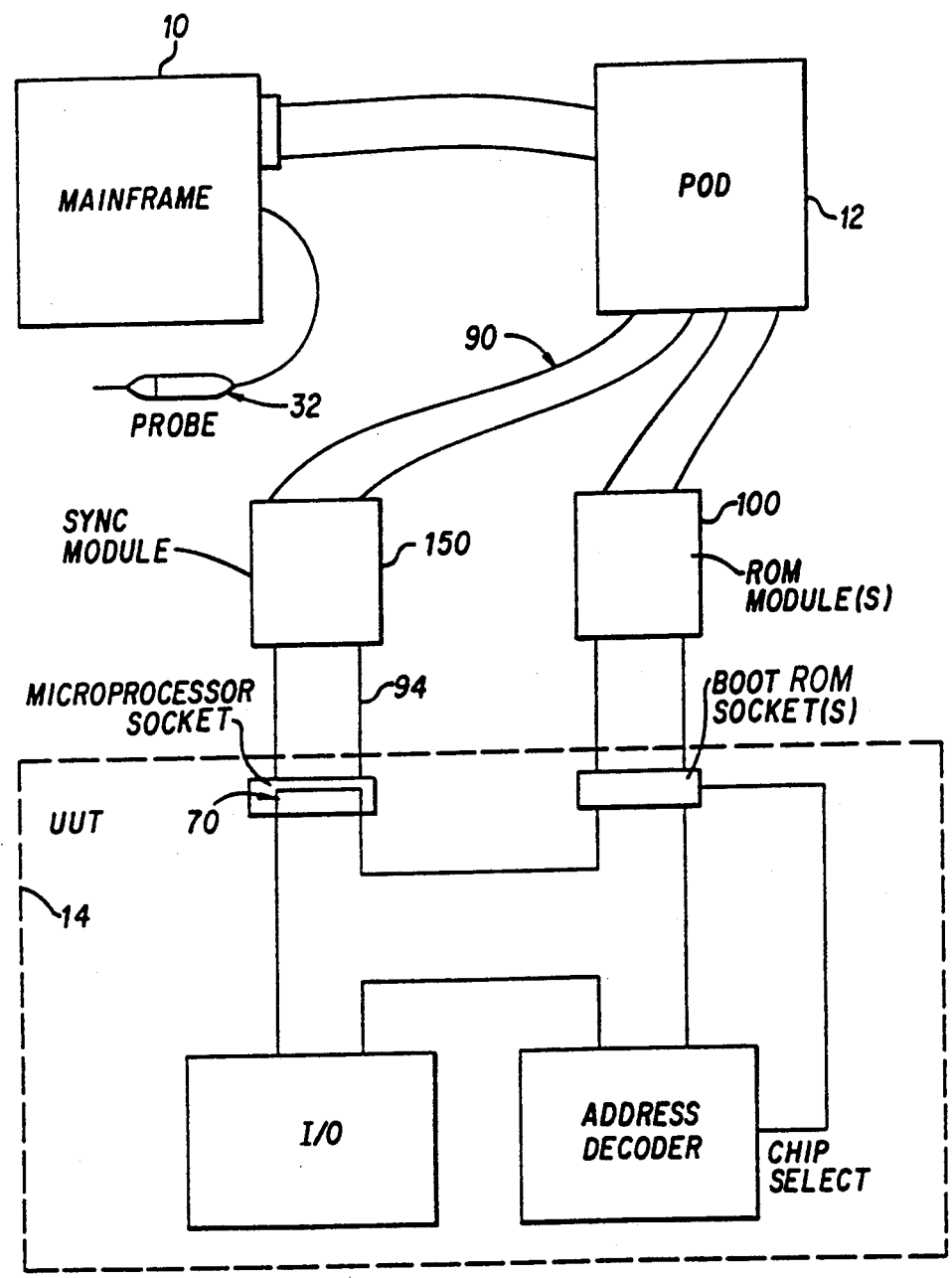
FIG. 2 is a simplified block diagram of the invention.

As an overview of the invention, with reference to FIG. 1, test apparatus connected to a UUT 14 includes a mainframe processor 10, arranged in a compact housing and including a keyboard 20, probe 32 and display 22, an interface pod 12, a sync module 150 including a sync module adapter 150 and at least one memory module 100 (two being illustrated) depending upon the memory configuration of the UUT 14. The memory module(s) connect to the UUT by a multi-conductor cable 92 and a plug corresponding to the UUT memory socket 72. FIG. 2 schematically illustrates the interconnection of the system shown in FIG. 1, showing the preferred arrangement of the apparatus in a plurality of housings. It is to be understood that the particular articulation of the elements of the system while being preferably as shown for the convenience of the operator could be packaged in more or fewer elements than shown. For instance, the pod could be entirely included within the same housing as the mainframe. It is also to be noted in FIG. 2 that while the memory module is electrically substituted for the UUT memory, either by physical replacement or by parallel connection while disabling the UUT memory, the sync module is connected to the μP which is left in place in the UUT circuit.

The method and apparatus employed in this invention analyzes the memory accesses detected and captured by the emulation memory to determine whether or not the sequence of such memory accesses is consistent with a functional $\mu P$ since even a functional $\mu P$ will not access the memory in the same manner on different repetitions of the same program. Thus there will be no "correct" order of the sequence of memory accesses. Even an exemplary sequence of memory accesses can not be empirically determined and would be of no value in determining the functionality of the $\mu P$.

The analysis technique of this invention makes two basic assumptions:

1. An instruction must be fetched before it is executed, and
2. Instruction fetches will be made in sequential order.

From the first of these assumptions, a criterion for verification can be established that data will not be fetched prior to the instruction requiring it. Therefore, another criterion for verification is that data will be accessed in sequential order, consonant with the second assumption, above.

The analysis technique of this invention, therefore, can be summarized as checking to see that instruction accesses are in sequential order, that data accesses are in sequential order and that the data access sequence is consistent with the instruction access sequence. While this will be described in greater detail below, it is significant to note that in practice, according to the invention, this will be accomplished by an extremely simple implementation, basically checking the memory access for consistency with the previous memory access or data access. If a particular memory access is consistent with neither, an error is reported.

Detailed Description

With the above brief overview of the invention in mind, operation of the system will be reviewed as a background for understanding the operation of the enhancements constituting the invention.

The testing system includes a plurality of novel procedures including a bus test primitive, a data stimulus primitive and an address stimulus primitive, which will be individually summarized below. Each of these primitives has utility for testing a particular portion of the kernel of a $\mu P$-based system and when utilized in a sequence according to the invention permit a higher degree of automated testing and diagnostics at higher speed and with greater operator convenience than has heretofore been available.

The bus test primitive is executed by a program in the mainframe of the test apparatus. The main function of the bus test primitive is to determine if the $\mu P$ is able to perform basic read and write operations in the kernel and can consist of as little as a single read and write. If successful, it will be known that the $\mu P$ is at least capable of accessing the memory, in this case, the emulation memory, receiving a bit pattern over the data bus and placing that bit pattern on the address bus where it can be received and monitored by the pod. Since the testing apparatus performs diagnostics of the data and address buses by the development of signatures, however, in the preferred embodiment, the bus test primitive is implemented as a program which is designed to exercise the portion of the data and address buses which correspond to the boot memory. Whether implemented as a single operation or a sequence of operations, it is significant that the bus test primitive is not exhaustive of the lines comprising the data and address buses or even of the combinations of bits which can be placed on those lines or portion of those lines and can thus function rapidly as a go/no go test.

The data stimulus primitive is implemented at a lower level of operability of the $\mu P$ than the bus test primitive, specifically by repeatedly resetting the $\mu P$; which function will have been tested prior to execution of the bus test primitive. Upon reset, the $\mu P$ accesses the first location in the boot memory and retrieves the bit pattern stored there. The data stimulus is not a program but is executed by altering the bit pattern in the first location of the boot memory for each reset. It is significant to note that this function is common to both the so-called vectored reset and execute-on-reset types of microprocessors. With either type of $\mu P$, the bit pattern retrieved from memory will be communicated over the data bus and will appear on the address bus. During reset, a sync pulse is generated by the $\mu P$ during the initial reading of the first location of the boot memory which is cartured by the sync module, communicated to the pod and used to evaluate signals appearing on the data bus, either by probing or non-probing tests to collect data bus line signatures. The latter is done by a procedure similar to the bus test using an exhaustive data stimulus sequence of bit patterns while monitoring the chip select line. The data stimulus sequence is exhaustive in the sense that it consists of a series of essentially arbitrary patterns which are, nevertheless, chosen such that a unique signature will be generated on each line of the data bus. As noted in the description of the bus test primitive, done on the memory bootspace, the chip select line (which is a logic function of the high-order bits on the address bus) will reflect an error only if one or more of the high-order bits is non-zero as is expected when cycling through boot space locations and the go/no go test will be passed even if one or more of the high order bus lines are tied to ground. In the same way, the presence or absence of a chip select signal as expected while performing the data stimulus sequence will reflect whether or not one of the high order lines is latched (e.g. shorted to ground). If this test is passed, only tied line defects, where a line of the data bus is tied to another data bus line, will remain. This can be later diagnosed by probing or, preferably by automatic diagnosis after address bus testing, which has been made possible by verification of the data bus.

After verification (as disclosed in the copending Polstra et al application), validation (as disclosed in the copending White et al application), testing or diagnosis of the data bus, testing of the address bus may be conducted using the same stimulus sequence as for the data stimulus primitive. However, this is done by conducting a programmed sequence of read/write instructions using these bit patterns and collecting signatures either with a probe, or preferably, in an analysis memory from which latched or tied lines may be deduced. As pointed out above, an exhaustive test of the address lines may be conducted using only the limited number of bit patterns in the stimulus sequence. Once the address bus lines have thus been fully diagnosed, full diagnosis of the data lines will be possible since any defect appearing on the databus lines will also be reflected on the address bus lines. Since the address bus lines have been fully diagnosed, any fault noted will be isolated to a particular bus. It is helpful to note that for execute-on-reset processors, the program for performing the address stimulus primitive can be a single instruction. For vectored reset processors, which look to the boot location address for the address of the first instruction, the address stimulus primitive typically requires no instructions at all; the desired bit pattern is merely placed into the emulation memory at the reset vector location.

To recapitulate the above summarized primitives in the context of the overall system and method, when it is desired to perform a test of the kernel of a μP-based system, an emulation memory is electrically substituted for the memory of the unit to be tested and a sync module is connected to timing information and forcing pins of the μP by conductors 140 (FIG. 3). When the test procedure is initiated, certain checks are made to ascertain that power is provided to elements of the kernel as will be enumerated in greater detail below. Then a reset overdrive check is performed to determine if the pod can, in fact, initiate a reset of the μP and is monitored by the sync module to determine if the reset line first goes active and then inactive. The actual reset of the μP is not checked in this step but only that a signal which should be capable of doing so is present at the appropriate pin of the μP.

Next, the sync module captures the clock signal of the μP which is evaluated. If the μP clock signal is not received by the pod, additional checks are made of the clock to determine if it is slow or shortened and for unexpected values of the signals on the forcing lines.

At this point, no tests have been performed on the μP itself but signals have been verified sufficiently to determine that such tests may now be done. The most rudimentary of these tests, the μP reset, is now done by overdriving the reset line and looking for a chip select signal on the chip select line corresponding to the boot memory location from address decoder 80. If successful, the μP will again be reset for the purpose of checking for the correct signal on the low order lines of the address bus to access the first location of the boot memory. This procedure will now have verified sufficient functionality of the kernel to proceed with the sequence of the bus test, and the sequence of data and address stimulus primitives as outlined above. It should be noted also that if any test conducted thus far has indicated a defect, a particular kernel fault will have been unambiguously indicated without requiring any more complex or high level function from the μP than reset. The bus test as outlined above, in its first (and possibly only) cycle will verify the only further function necessary to fully test and diagnose the remainder of the kernel: a read and write operation. It should also be kept in mind that because of the high resolution sync pulses produced by the sync module, bus cycles of interest can be isolated and evaluations of the buses can be conducted according to the signatures produced in response to the stimulus patterns imposed to exercise the lines. Since, for example, only twelve bit patterns, as disclosed in the Polstra et al application, are necessary in a stimulus primitive in order to exercise thirty-two lines in a bus to develop a unique signature for each line for fully diagnosing the bus, significant increases in testing speed can be achieved.

In accordance with the invention and with reference again to FIG. 3, conductors 140 are connected to the reset line and other lines on which signals reflecting the operational state (status pins) of the UUT μP will appear. For example, on the 80386 processor, these lines will be the HOLD, HLDA (hold acknowledge), ADS, READY, CLK$^2$, and RESET lines. These signals will be received by buffers 152 over lines 140 and transmitted to the pod over cable 90 as inputs to bus cycle state machine 200. Bus cycle state machine 200 will perform a logical operation on these signals, under control of the mainframe 10, to develop a control signal for controlling sync pulse generation state machine 202 which generates a sync signal in response thereto. This sync signal is sent to mainframe 10 which generates control signals therefrom which are returned to various parts of the pod as illustrated, notably the analyzer RAM 62.

The mechanism for analyzing the address trace, according to this invention, with reference to FIGS. 4 and 5, provides verification of kernel circuitry as follows. A test program, such as that of FIG. 4, in which the instruction and data addresses are arranged to be in monotonically ascending order is loaded into the emulation memory. These codes are given in hexadecimal notation. The instruction locations are given in the sequence 0000, 0003, 0006 and 0009. The corresponding data location are, respectively, 0100, 0200, 0400 and the jump instruction 0009. Corresponding to this program, a checking table will be established as shown in FIG. 5. Each entry in the checking table describes one memory access and defines the instruction address, the data address and the data size, thus describing the dependency relationship between the data accesses and the instructions which cause the data accesses to occur. Only the data accesses have entire in the checking table since the sequence of instruction fetches is inferred by the verification algorithm since the program is known.

An actual address trace of memory accesses is shown in FIG. 6. When the μP is reset, it will begin to function by looking for an instruction at location 0000, which, in this example, is an instruction to perform a load operation no the data at location 0100. On the next cycle, it will look for an instruction at location 0001, and so on. Since another instruction is not provided until location 0003 (FIG. 4), it will proceed through step 0002. Since another instruction is present at location 0003, and the previously fetched instruction has not been executed, step 3 (FIG. 6) will cause execution to begin by performance of the data access at address 0100. As indicated in FIG. 6, a fetch of data at address 0100 would have been appropriate to any of steps 1-3. Beginning with step 4, the process is repeated an arbitrary number of times in a similar fashion. At step 12, address 0009, containing a jump instruction, is accessed. This jump is directed to address 0009 and forms a loop which will be executed until interrupted. Execution of the jump will be appropriate to any of the next few following steps as indicated in FIG. 6. The important point to note is that the memory access must be appropriate to either the previously accessed instruction address or the address specified by the previously accessed instruction. If it is neither, an error is reported.

The overall flow diagram of FIG. 7 will be seen to follow this sequence in somewhat greater detail. It has been shown how the major data structure of this invention, the checking table, functions to permit verification to be carried out. Other data structures which are preferably maintained to facilitate the analysis are as follows.

The "Access Sequence Number" is a variable that indicates which step of the address sequence is being considered. Beginning at 0, it increases linearlyas successive addresses are analyzed.

The "Instruction Fetch Pointer" points into the checking table and is incremented as instructions are fetched. the address indicated by the instruction fetch pointer and following addresses are assumed to have not been fetched while addresses preceding the pointer are assumed to have been fetched.

The "Data Access Pointer" also points into the checking table and is sequentially incremented in the same fashion. The same assumptions apply as for the Instruction Fetch Pointer except that it will divide the data addresses assumed fetched from those assumed unfetched.

The "Access Type Flags" indicate what types of memory accesses might be expected at any particular stage of the analysis. Possibilities are INST—instruction fetch, DATA—Data access and JUMP—a non-sequential instruction fetch caused by a jump. One or more of these flags is set at each step of the analysis. If both INST and DATA are set, either an instruction or data fetch will be accepted as appropriate. If only INST is set, only an instruction fetch will be accepted. DATA and JUMP are never set simultaneously.

The "Next Instruction Address" specifies the address at which the next instruction fetch is expected to occur and is used only when the INST flag is set.

The "Next Data Address" specifies the address of the next expected data fetch or jump target and is used when either of the JUMP or DATA flags are set.

The "Next Data Size" is used when the DATA flag is set and specifies the number of bytes expected to be accessed during the next data access.

Figure 8:
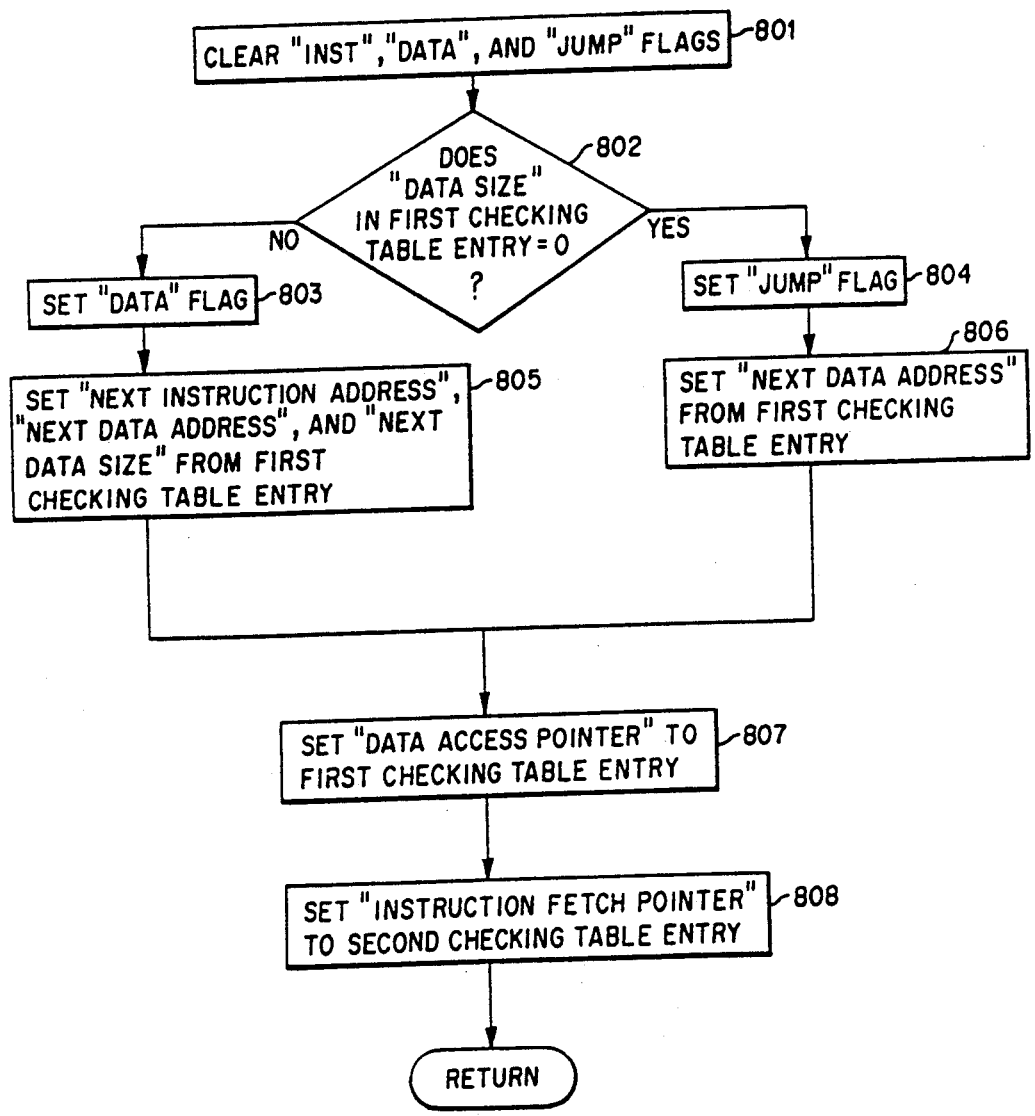
FIG. 8 is a detail flow diagram of the initialize step of FIG. 7.

Returning to FIG. 7, the first step of the verification process is to initialize the system (701). From FIG. 8, it is seen that this step clears the flags (801) and resets (802) either the DATA (803) or JUMP (804) flag responsive to the Data Size value. If the DATA flag is set, the Next Instruction address and Next Data Size will be set (805) from the checking table. If the JUMP flag is set, the Next Data Address is set (806) from the checking table. These checking table entries having been accessed, the Data Access Pointer (807) and Instruction fetch Pointer (808) are incremented.

Figure 9:
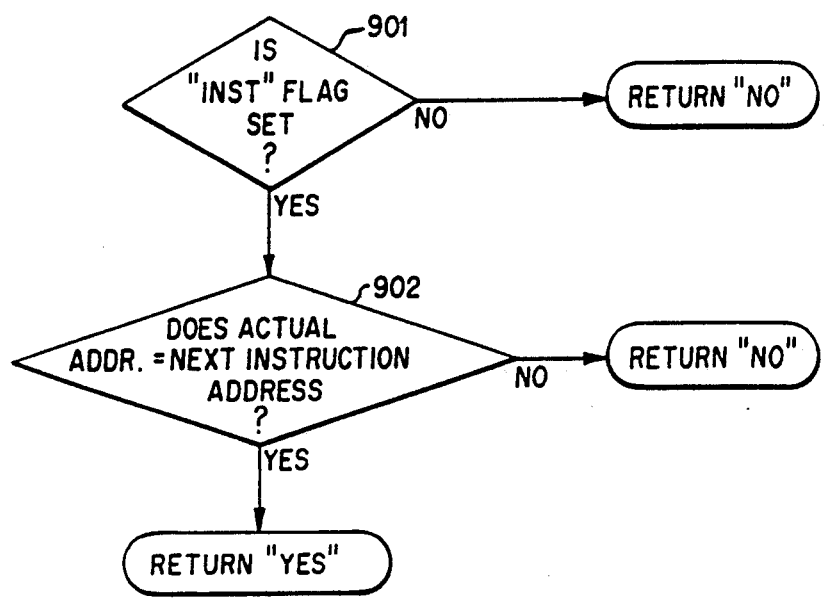
FIG. 9 is a detail flow diagram of the "Could Actual Addr. be an Instruction fetch?" step of FIG. 7.
Figure 10:
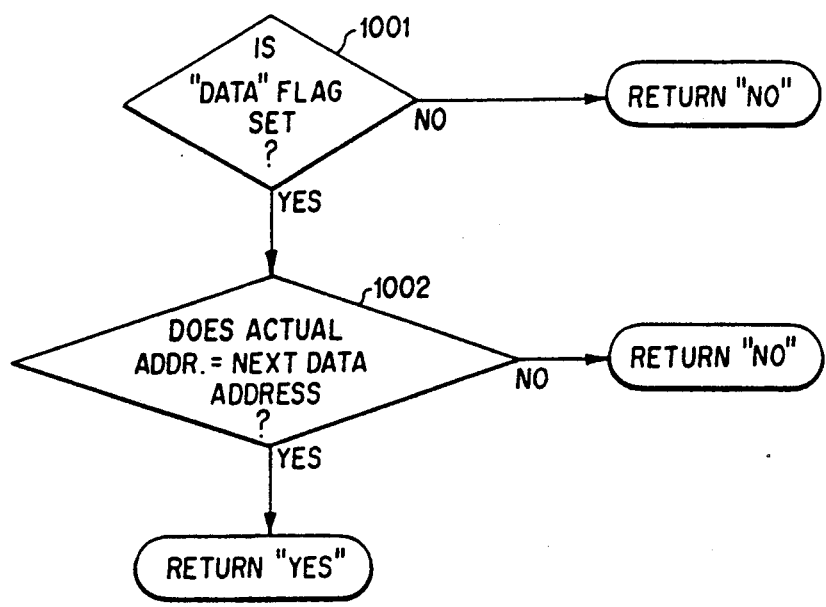
FIG. 10 is a detail flow diagram of the "Could Actual Addr. be a Data Access?" step of FIG. 7.
Figure 12:
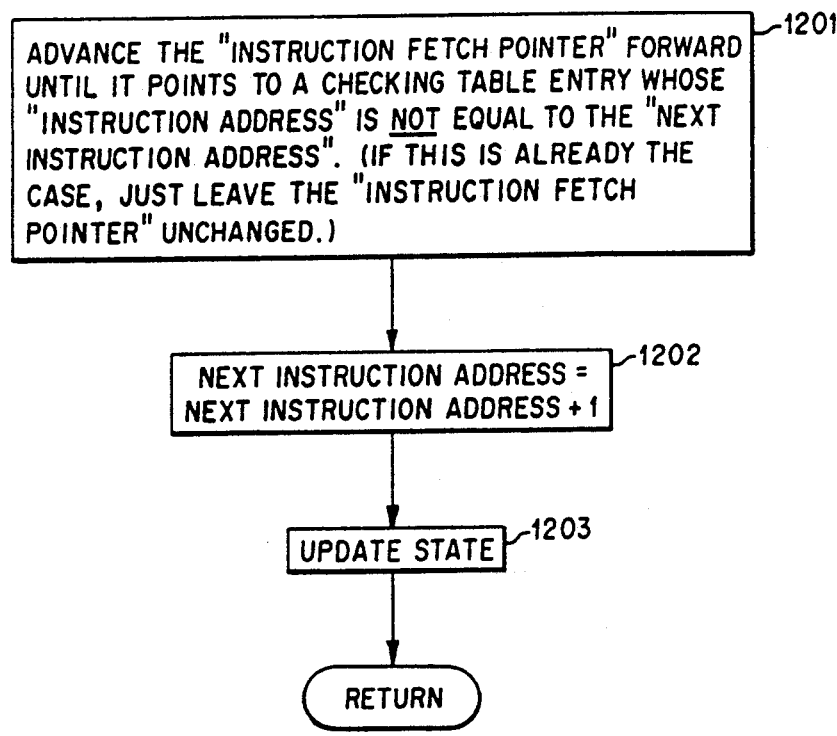
FIG. 12 is a detail flow diagram of the "Process Instruction Fetch" step of FIG. 7.
Figure 15:
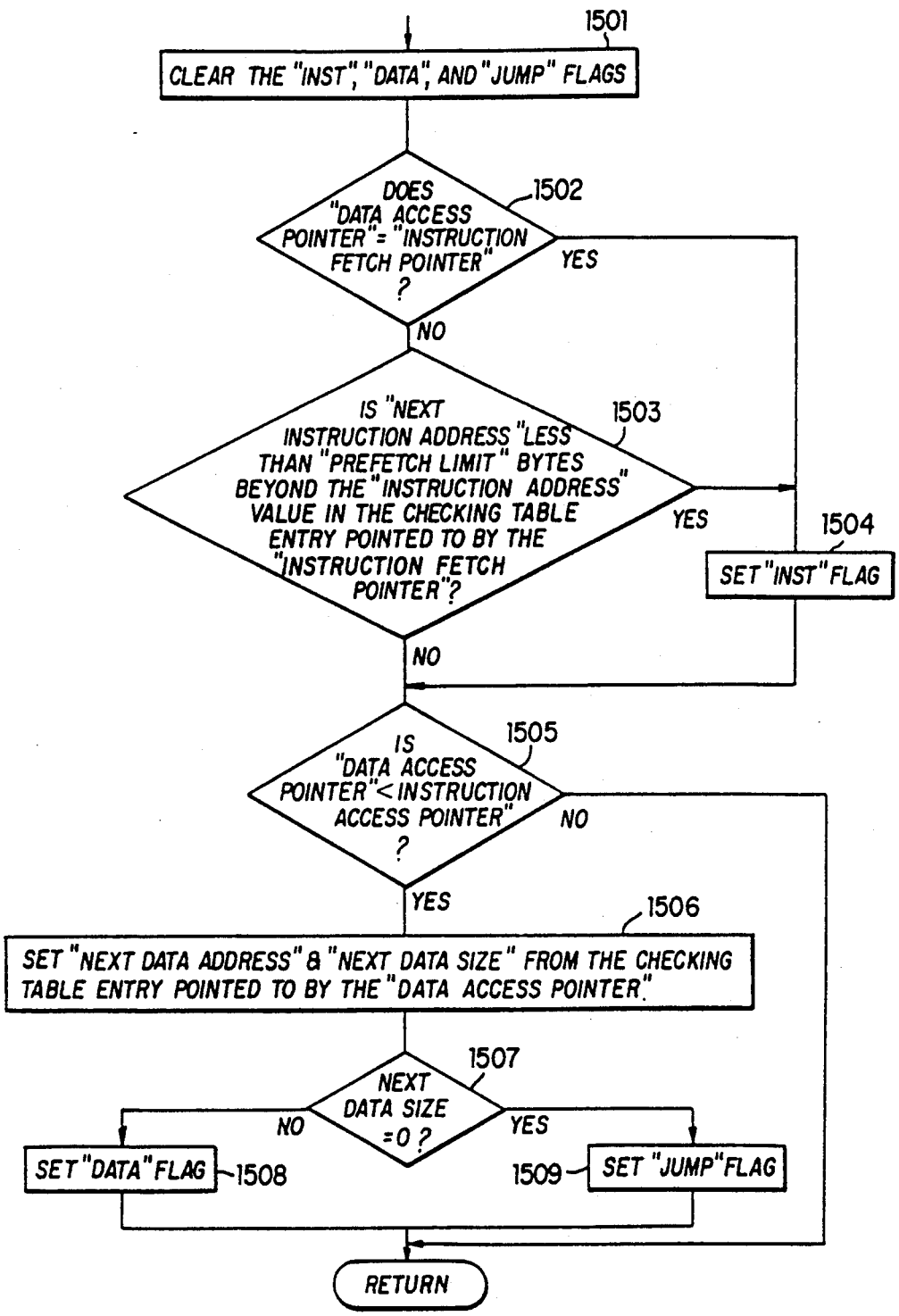
FIG. 15 is a detail flow diagram of the "Update State" step of FIG. 7.

The next step (FIG. 7) is to set (702) the Access Sequence Number to 0. Then the Actual Addr. is set to be equal to the access sequence number (703). Next, it will be determined (704) if the Actual Addr. value could be an instruction fetch. Referring to FIG. 9, the INST flag will be checked (901). If not set, the next instruction cannot be an instruction and the following step of FIG. 7 (705) will be performed. If the flag is set, the Actual Addr. value will be compared (902) to the Next Instruction Address value and if equal, the process will branch to the Process Instruction Fetch step (FIG. 12) which increments the Instruction Fetch Pointer (1201) and the Next Instruction Address (1202) and performs (1203) the Update State procedure (FIG. 15). Otherwise, the process will proceed to evaluate the access as a possible data access. FIG. 10 shows a procedure similar to that of FIG. 9, checking first the DATA flag (1001) and then the equality of the Actual Addr. with the Next Data Address value (1002), possibly branching as indicated to Process Data Access shown in FIG. 13.

The Process Data Access step (708) increments the Next Data Address value and decrements the Next Data Size value (1301). Since the data fetched may be a large number of presumably contiguous bytes, the next address expected will be at the next higher address while decrementing the data size provides a means of detecting when the data fetch is complete in the next step (1302) of FIG. 13 which tests the Next Data Size value to determine if it equals 0. This feature also permits only a single entry in the checking table for a data fetch, regardless of size. If the Next Data Size equals 0, (1302) the data access pointer is incremented in the checking table, (1303) the state is updated (1304) as shown in FIG. 15 and the process returns to the procedure shown in FIG. 7. If not, all flags but the data flag are cleared (1305), since the continuing fetch must be of more data and the data fetch will be continued by again decrementing the Next Data Size and repeating the loop until the Next Data Size is reduced to 0.

Figure 11:
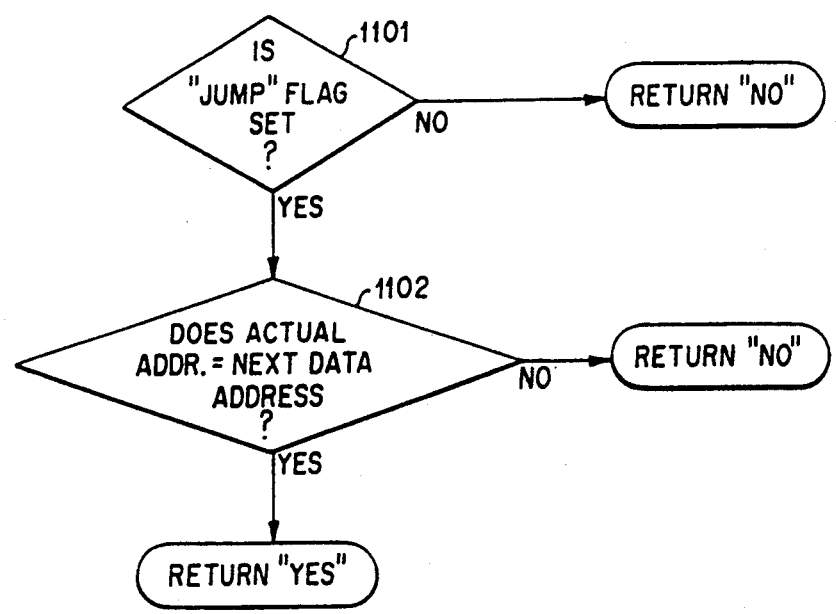
FIG. 11 is a detail flow diagram of the "Could Actual Addr. be a Jump Target?" step of FIG. 7.

If the branch did not occur, the analysis continues by evaluating the Actual Addr. to determine if it is a jump target as illustrated in FIG. 11. This is again similar to FIGS. 9 and 10, first evaluating the state of the JUMP flag (1101) but then checking the Actual ADDR. to determine if it equals the Next Data Address value (1302). Since the DATA and JUMP flags are never simultaneously set, an Actual Addr. which equalled the Next Data Address would have resulted in the processing of a data access if the DATA flag had been set (FIG. 10) and since it has already been determined (FIG. 11) that the JUMP flag was set, a valid jump is necessarily specified and the analysis will proceed as shown in FIG. 14.

Figure 14:
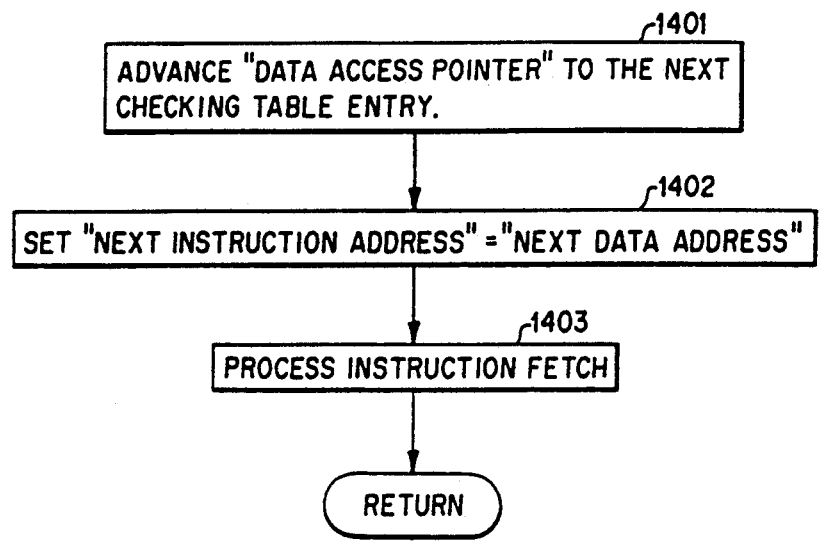
FIG. 14 is a detail flow diagram of the "Process Jump" step of FIG. 7.

If a proper jump is identified, it will be processed (209) as shown in FIG. 14. The Data Access Pointer is advanced (1401) in the checking table and the Next Instruction Address is set to equal the Next Data Address (1402). This is done because the jump has been determined to be valid, the Actual Addr. value has been determined to equal the Next Data Address value and the jump instruction will, in fact, be at that address, thus obviating the need to separately store that address and the jump instruction may be fetched by an instruction fetch (1403).

At this point, all possible types of memory accesses will have been fully evaluated and if an access cannot be deemed reasonable as an instruction fetch, a data fetch or a jump, a fault must be reported as shown in FIG. 7.

Figure 13:
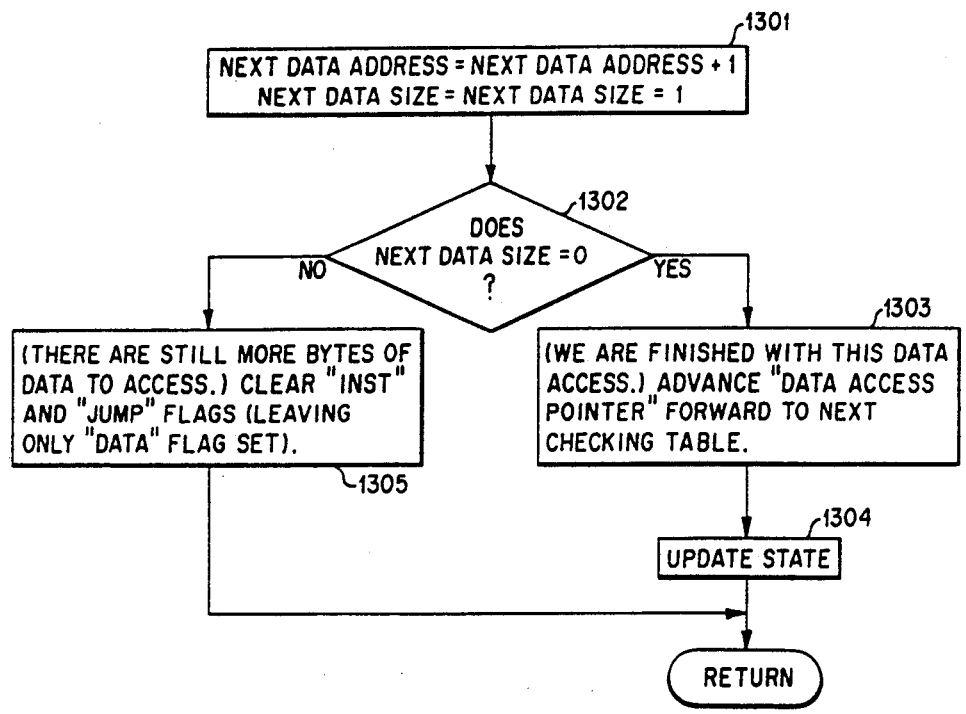
FIG. 13 is a detail flow diagram of the "Process Data Access" step of FIG. 7.

The Update State procedure, noted above, is illustrated in FIG. 15. This procedure will be invoked upon the processing of an instruction fetch (FIG. 12) or a data access (FIG. 13). This procedure insures that flags and pointers are correctly set upon completion of these operations with respect to the prefetch limits of the particular $\mu P$ being tested. All flags are first cleared (1501) and the relative addresses of the pointers are checked for equivalency (1502). If the pointers are not equal, the Next Instruction Address is checked to determine if it is within the prefetch limits beyond the Instruction Fetch Pointer (1503). In either case, the INST flag is set (1504). If not within the prefetch limit, or after the setting of the INST flag, an evaluation is made to determine if the next expected data access corresponds to the next expected instruction fetch, (1505) specifically, is the Instruction Access Pointer greater (e.g. at a later entry of the checking table) than the Data Access pointer? If not, the analysis process can continue. If so, an incomplete memory access will be indicated and the Next Data Address and the Data Size will be reset from the checking table (1506) and the JUMP (1509) or Data (1508) flag will be appropriately set to complete the access when the process is continued.

Finally, the continuation of the analysis procedure after any process step (FIGS. 12-14) checks to determine if the analysis is complete (710) and, since the test program preferably terminates in a loop initiated by a jump, is done at the will of the operator. Prior to the procedure termination, the Access Sequence Number is incremented and the process is repeated (711).

In accordance with the detailed description of the invention set out above, an apparatus and method have been provided for the automatic verification of the kernel circuitry of μP-based systems based on an analysis of memory accesses which fully compensates for the unpredictability of such memory accesses due to instruction prefetch of the μP. The analysis provided by the invention uses a test program and a corresponding checking table for use with pointers and flags to facilitate recognition of expected types of memory accesses.

Having thus fully described the invention in detail it will be appreciated that many variations and modifications will be apparent to persons skilled in the art without departing from the spirit and scope of the invention. The detailed description set forth above is intended as being by way of example and not of limitation; the scope of the invention being limited only by the appended claims.

I claim:

1. A method for verification of a unit under test having a microprocessor including prefetch logic comprising the steps of
   providing an emulation memory for testing kernel circuitry of said unit under test,
   loading a test program and corresponding checking table into said emulation memory,
   causing said microprocessor to execute said test program,
   monitoring the address of each memory access during execution of said test program,
   identifying each address accessed as one of at least an instruction access and a data access,
   determining if the address of each instruction access is greater than the preceding instruction access address,
   determining if the address of each data access is greater than the preceding data access address,
   determining if the address of each data access corresponds to a location of data specified in the most recently accessed instruction, and
   establishing verification of said kernel circuitry based upon the results of said determining steps.

2. A method for verification of a unit under test having a microprocessor including prefetch logic comprising the steps of
   providing an emulation memory for testing kernel circuitry of said unit under test,
   loading a test program and corresponding checking table into said emulation memory,
   causing said microprocessor to execute said test program,
   monitoring the address of each memory access during execution of said test program,
   identifying each address accessed as one of at least an instruction access or a data access,
   determining if the address of each instruction access is greater than the preceding instruction access address,
   determining if the address of each data access is greater than the preceding data access address,
   determining if the address of each data access corresponds to a location of data specified in the most recently accessed instruction, and
   preventing verification of said kernel circuitry if the conditions specified in any one of said determining steps is not met.

3. A method according to claim 1, including the step of
   providing flags corresponding to said at least one of said instruction access and data access for indicating whether an instruction access or a data access is possible, respectively.

4. A method according to claim 3, wherein at least one said determining step includes the steps of
   determining if a said corresponding flag is set and
   determining if the address accessed corresponds to an address in said checking table.

5. A method according to claim 1, wherein data is provided in said checking table corresponding to a data access address and an instruction address in correspondence with to said test program.

6. A method according to claim 5, wherein said data in said checking table is further provided with data size information corresponding to said test program.

7. An apparatus for verification of a unit under test having a microprocessor including prefetch logic comprising:
   an emulation memory means for testing kernel circuitry of said unit under test,
   loading means coupled to said emulation memory means for loading a test program and corresponding checking table into said emulation memory, and
   initialization means coupled to said microprocessor for causing said microprocessor to execute said test program,
   wherein said emulation memory means includes means for monitoring the address of each memory access during execution of said test program,
   identification means for identifying each address accessed as one of at least an instruction access and a data access,
   first comparison means for comparing each address of each instruction access with the preceding instruction access address,
   second comparison means for comparing each address of each data access with the preceding data access address,
   determination means for determining if the address of each data access corresponds to a location of data specified in the most recently accessed instruction, and
   means responsive to said first and second comparison means and said determination means for establishing verification of said kernel circuitry.

8. An apparatus according to claim 7, wherein said emulation memory means further includes means for containing flags corresponding to said at least one of said instruction access and data access for indicating whether an instruction access or a data access is possible, respectively.

9. An apparatus according to claim 8, wherein at least one of said first and second comparison means is enabled by a corresponding one of said flags.

10. An apparatus according to claim 7, wherein said checking table includes data corresponding to a data access address and an instruction address in correspondence with said test program.

11. An apparatus according to claim 10, wherein said checking table further includes data size information corresponding to said test program.

* * * * *